(12) United States Patent
Palmute

(10) Patent No.: US 9,545,056 B2
(45) Date of Patent: Jan. 17, 2017

(54) ROW DIVIDER CONTAINING A HELICOIDAL LIFT OF VARIABLE CROSS SECTION AND A SUGAR CANE HARVESTER

(71) Applicant: Marchesan Implementos e Maquinas Agricolas Tatu S.A., Matao (BR)

(72) Inventor: Valter Palmute, Araras (BR)

(73) Assignee: Marchesan Implementos e Máquinas Agrícolas Tatú S.A., Matão (BR)

( * ) Notice: Subject to any disclaimer, the term of this patent is extended or adjusted under 35 U.S.C. 154(b) by 0 days.

(21) Appl. No.: 14/771,653

(22) PCT Filed: Mar. 18, 2014

(86) PCT No.: PCT/BR2014/000081
§ 371 (c)(1),
(2) Date: Aug. 31, 2015

(87) PCT Pub. No.: WO2014/153632
PCT Pub. Date: Oct. 2, 2014

(65) Prior Publication Data
US 2016/0007533 A1 Jan. 14, 2016

(30) Foreign Application Priority Data
Mar. 26, 2013 (BR) .......................... 10 20130070971

(51) Int. Cl.
*A01D 45/02* (2006.01)
*A01D 63/02* (2006.01)
(Continued)

(52) U.S. Cl.
CPC .............. *A01D 63/02* (2013.01); *A01D 45/10* (2013.01); *A01D 57/01* (2013.01); *A01D 57/22* (2013.01)

(58) Field of Classification Search
CPC ........ A01D 45/10; A01D 63/02; A01D 57/01; A01D 57/22
(Continued)

(56) References Cited

U.S. PATENT DOCUMENTS 1,419,347 A * 6/1922 Baird ..................... A01D 63/02
56/119
1,777,112 A * 9/1930 Baker ................... A01D 45/021
56/119
(Continued)

FOREIGN PATENT DOCUMENTS

AU 450518 B2 6/1974
BR PI0800094-8 A2 9/2009
(Continued)

OTHER PUBLICATIONS

International Searching Authority, International Search Report and Written Opinion for International Application No. PCT/BR2014/000081, Jul. 20, 2015, 8 pages, European Patent Office, The Netherlands.

*Primary Examiner* — Thomas B Will
*Assistant Examiner* — Mai Nguyen
(74) *Attorney, Agent, or Firm* — Alston & Bird LLP

(57) ABSTRACT

The objective of the present invention is achieved by means of a row divider (1) applied to a sugar cane harvester (100). Said device (1) comprises at least one helicoidal lift (2) connected to an engine. Said helicoidal lift (2) has a conical shape geometry of variable cross section around an imaginary central axis (102), and comprises a first segment (3) and a second segment (4). The first segment (3) establishes a first generatrix (5) which defines an angle a to the central axis (102) and comprises a first screw thread (6) in its outer surface. The second segment (4) establishes a second generatrix (7) which defines an angle β to the central axis (102), so that β has a greater value than a. Said second segment (4)

(Continued)

comprises a second screw thread (8) in its surface, which is oriented in the opposite direction of the first screw thread (6). Said device provides a higher peripheral speed in the last stage of separation and direction of the sugar cane cut by the blades of a sugar cane harvester (100) and lifted by the first segment (3) of the helicoidal lift (2) of a row divider (1). This aims to facilitate and expedite the work of the harvester (100), since it prevents the accumulation of material improperly positioned at the mouth of the harvester (100).

7 Claims, 4 Drawing Sheets

(51) Int. Cl.
    *A01D 45/10*     (2006.01)
    *A01D 57/01*     (2006.01)
    *A01D 57/22*     (2006.01)

(58) Field of Classification Search
    USPC .......................................................... 56/119
    See application file for complete search history.

(56) References Cited

U.S. PATENT DOCUMENTS

| | | | | |
|---|---|---|---|---|
| 2,738,638 A | * | 3/1956 | Pool | A01D 65/00 56/119 |
| 2,933,876 A | * | 4/1960 | Davin, Jr | A01D 45/021 56/104 |
| 3,173,236 A | * | 3/1965 | Byrd | A01D 57/00 56/119 |
| 3,673,774 A | * | 7/1972 | Mizzi | A01D 45/10 56/13.3 |
| 3,705,482 A | * | 12/1972 | Purrer | A01D 43/082 56/13.9 |
| 4,035,996 A | * | 7/1977 | Fernandez | A01D 45/10 56/13.9 |
| 4,137,695 A | * | 2/1979 | Sammann | A01D 65/00 56/106 |
| 4,154,047 A | * | 5/1979 | Quick | A01D 45/10 56/13.9 |
| 4,470,244 A | * | 9/1984 | Leigers | A01D 63/02 56/13.9 |
| 4,924,662 A | * | 5/1990 | Quick | A01D 45/10 56/12.8 |
| 5,131,216 A | | 7/1992 | Otten et al. | |
| 5,157,904 A | * | 10/1992 | Otten | A01D 45/10 56/14.3 |
| 8,240,115 B2 | | 8/2012 | Marchini | |

FOREIGN PATENT DOCUMENTS

| | | |
|---|---|---|
| BR | PI0106044-9 B1 | 1/2011 |
| BR | PI1003959-7 A2 | 12/2011 |
| DE | 4001460 A1 | 7/1991 |
| DE | 4015894 A1 | 11/1991 |
| FR | 2753876 A1 | 4/1998 |

* cited by examiner

ROW DIVIDER CONTAINING A HELICOIDAL LIFT OF VARIABLE CROSS SECTION AND A SUGAR CANE HARVESTER

CROSS REFERENCE TO RELATED APPLICATIONS

This application is a national stage application, filed under 35 U.S.C. 371, of International Application No. PCT/BR2014/000081, filed Mar. 18, 2014, which claims priority to Brazilian Patent Application No. 102013007097-1, filed Mar. 26, 2013, the contents of both of which as are hereby incorporated by reference in their entirety.

BACKGROUND

Technical Field

The present invention relates to a row divider applied to a sugar cane harvester which uses a helicoidal lift with two conical segments.

Description of Related Art

A row divider in a sugar cane harvester has the function of assisting the feeding of sugar cane to the base cutting device of the harvester.

This device usually uses at least one helicoidal lift (although it is more common to find two or more pairs of helicoidal lifts), whose geometry usually has a trunk-conical shape. This helicoidal lift also usually has a screw thread disposed on its outer surface, said screw thread being partially oriented in a clockwise direction and partially oriented in a counterclockwise direction, so that the cane stalks are lifted to a position which is determined by the junction of these two screw threads.

This helicoidal lift, once set into rotation by the torque of an engine, is capable of traversing the existing spaces between the sugar cane rows, separating the cane in the rows which are adjacent to the sugar cane row that is being harvested, and raising and collecting the canes laying between the rows of the plantation.

Throughout this process of separation, the extracted plant material must be positioned so as to enter the mouth of the cane harvester, thereby forming a flow towards the interior of the harvester so that this sugar cane can be conveyed along the harvester for storage.

Similar devices can be observed in a large number of equipments present in the prior art. For example, documents PI0800094-8, PI1003959-7 and PI0106044-9 have row dividers attached to the front area of a cane harvester. In those cases it is possible to observe some already existing variations of this device, such as the use of two pairs of helicoidal lifts in the devices of document PI1003959-7 and PI0800094-8, and the presence of mechanisms that provide a suitable mobility to the row divider, protecting it against possible irregularities of the soil, as in the device of document PI0106044-9.

However, the row dividers currently known, when separating and directing the sugar cane to the mouth of the cane harvester, lack a suitable acceleration to efficiently perform said separation and direction.

This leads to the accumulation of a significant amount of material in the inlet of the harvester, causing loss of productivity and risk of clogging the inlet of the harvester.

BRIEF SUMMARY

The present invention has as main objective to provide greater peripheral speed in the last stage of separation and direction of the sugar cane cut by the blades of a sugar cane harvester and lifted by the first segment of the helicoidal lift of a row divider. This speed increase aims to facilitate and expedite the work of the harvester as it prevents the accumulation of the material which is improperly positioned in the mouth of the harvester.

This is particularly advantageous in situations of greater volume of tangled sugar cane or in places that allow a higher working speed.

Additionally, a second objective of the present invention consists in providing a helicoidal lift for a sugar cane harvester that allows the introduction of the engine used to set this helicoidal lift into rotation in its own structure. This is advantageous, since it saves space along the structure of the harvester while protecting the engine from the action of external agents, such as cane straw and dust.

The objectives of the present invention are achieved by means of a row divider applied to a sugar cane harvester.

This device comprises at least one helicoidal lift connected to an engine, said helicoidal lift having a conical geometry of variable cross section around an imaginary central axis central and comprising a first segment and a second segment.

The first segment establishes a first generatrix that defines an angle $\alpha$ to the central axis and has a first screw thread in its outer surface. The second segment establishes a second generatrix that defines an angle $\beta$ to the central axis, so that $\beta$ has a higher value than $\alpha$, and comprises a second screw thread, which is oriented in the opposite direction of the first screw thread, in its outer surface.

In a preferred but not limiting embodiment, this device comprises from one to four helicoidal lifts. Moreover, in this configuration there could be observed relations between the dimensions of the helicoidal lift, such as the ratio between the length of the second segment of the helicoidal lift and the length of the first segment of the helicoidal lift, which has a value between 1 e 0.25, and the difference between angles $\beta$ and $\alpha$, which has a modulus value between 10° and 35°, preferably 11°.

The present invention also relates to a sugar cane harvester which comprises a row divider 1 as previously defined.

BRIEF DESCRIPTION OF THE FIGURES

The present invention will be hereinafter further described based on examples of execution represented in drawings below. The figures show.

DETAILED DESCRIPTION OF VARIOUS EMBODIMENTS

Figure 1:
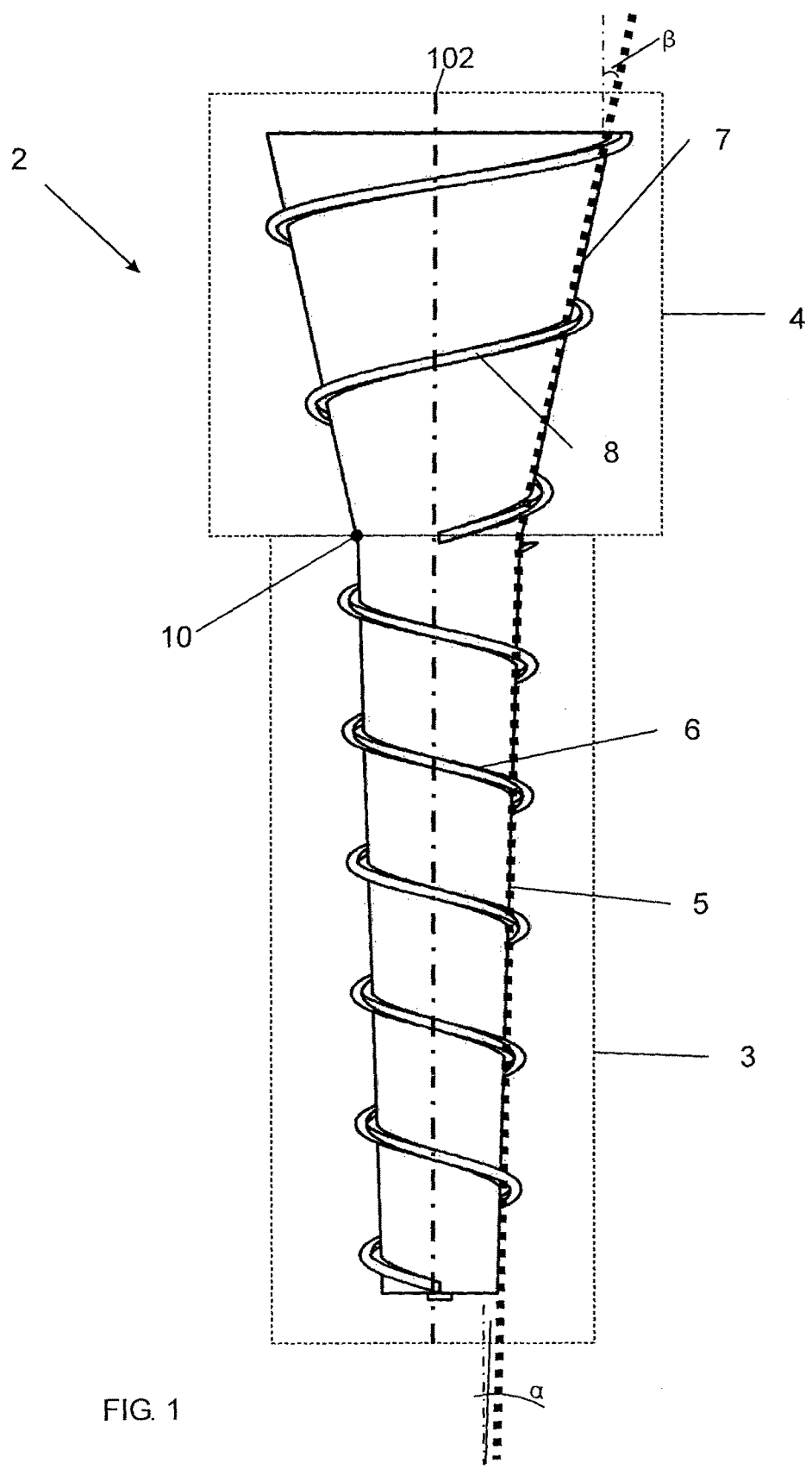
FIG. 1—A side view of the helicoidal lift of the row divider of the present invention.

Firstly, in FIG. 1, there can be observed the main constructive details of the helicoidal lift 2 used in device 1 in a preferred embodiment of the present invention.

We can distinguish the part corresponding to the first segment 3 of the helicoidal lift, which has a trunk-conical shape with a first generatrix 5 whose tilt defines an angle α to the central axis of part 102. This first segment 3 comprises a first screw thread 6, oriented clockwise so that, with the rotation of the engine, the sugar cane can be lifted and properly separated.

Also the constructive characteristics of the second segment 4 of the helicoidal lift 2 can be observed. This second segment 4 has a trunk-conical shape with a second generatrix 7 whose tilt forms an angle β to the central axis of part 102.

It is also possible to note in this segment that the second screw thread 8 is oriented counterclockwise, producing a limiting effect in this point of the helicoidal lift 2, since, when reaching this point, the sugar cane will remain in this position until being cut. The junction 10 between the second screw thread 8 and the first screw thread 6 defines the height reached by the cane stalks, thereby preventing the sugar cane from continuing rising up toward the machine causing damage to the sugar cane harvester 100.

Based on this embodiment it is possible to visually perceive that β has a value greater than α. The key to the embodiment of this invention is based on this aspect, as a larger diameter in this region of the helicoidal lift 2 provides a higher peripheral speed in the second segment 4, since the angular speed of the helicoidal lift 2 is maintained constant, and the consequence thereof is a more efficient direction for the row divider 1.

In the preferred embodiment of the present invention, disclosed in the figures of this report, the segments were designed so that the first segment 3 has a circular initial cross section with a diameter of 167 mm. This section increases uniformly along the length of the first segment 3, whose value in this embodiment is 1100 mm, until it reaches a diameter of 236 mm. Then it starts the second segment 4 of the part, which extends for more 600 mm, reaching at the end of the helicoidal lift 2 a diameter of 500 mm.

In this preferred embodiment, the angles α and β have values which are substantially equal to 1.8° and 12°. The value of the difference between β and α is defined as being substantially equal to 1°. However, this value can assume any value between 10° and 35°.

Figure 2:
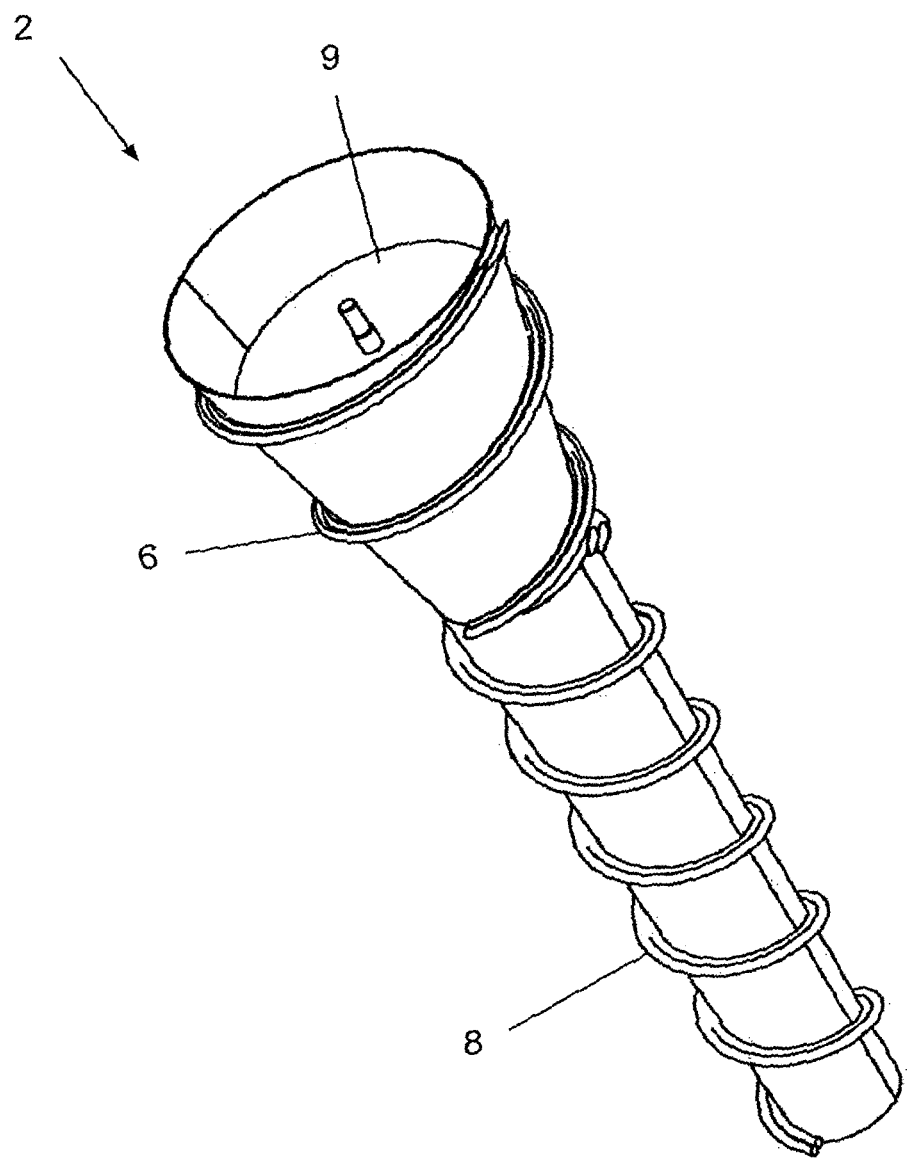
FIG. 2—A perspective view of the row divider of the present invention.

FIG. 2 shows a perspective view of the same helicoidal lift 2 previously disclosed. However, in this view, it is possible to observe the cavity existing within the second segment 4, in which it is possible to introduce a small engine to set the whole structure of the helicoidal lift 2 into rotation. At the same time, in this Figure it is possible to observe the opposing orientations of the screw threads 6 and 8 and of the first and second segments 3 and 4.

Figure 3:
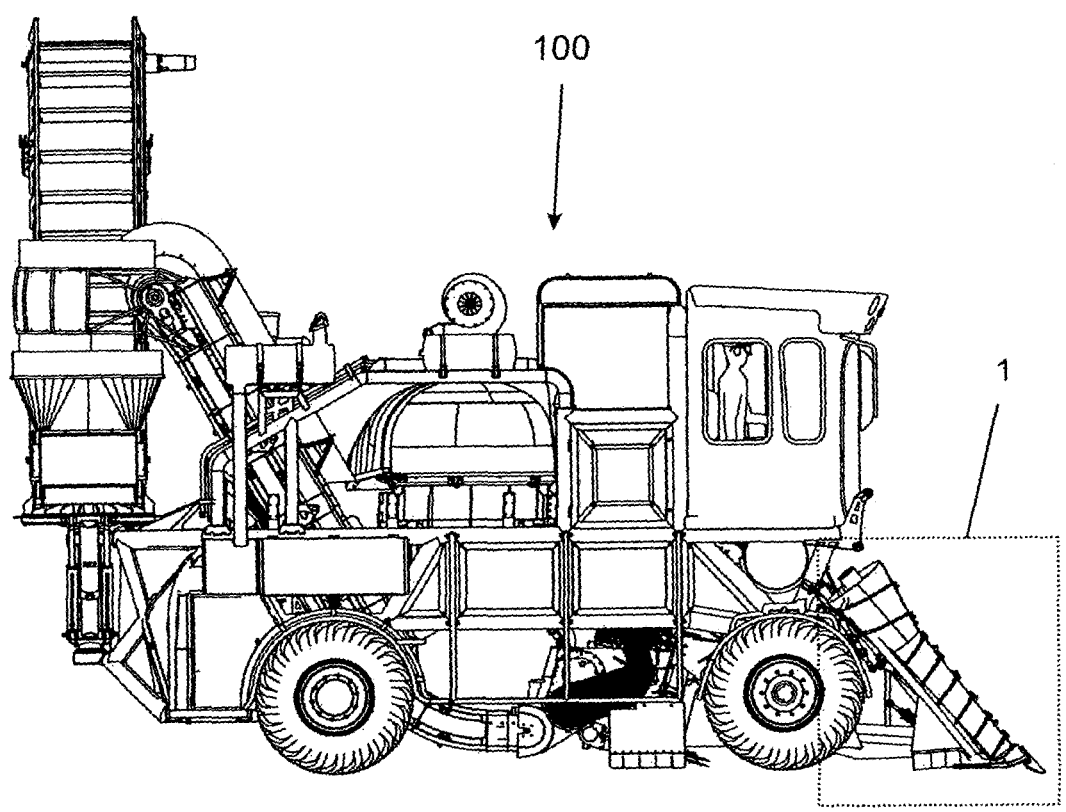
FIG. 3—A side view of a sugar cane harvester having the row divider of the present invention.

In FIG. 3 is shown a side view of the complete preferred embodiment of the row divider 1 of the present invention connected to a sugar cane harvester 100. In this figure it can be observed the position of the row divider 1, which makes the first contact with the sugar cane and directs it to the interior of the harvester 100.

Figure 4:
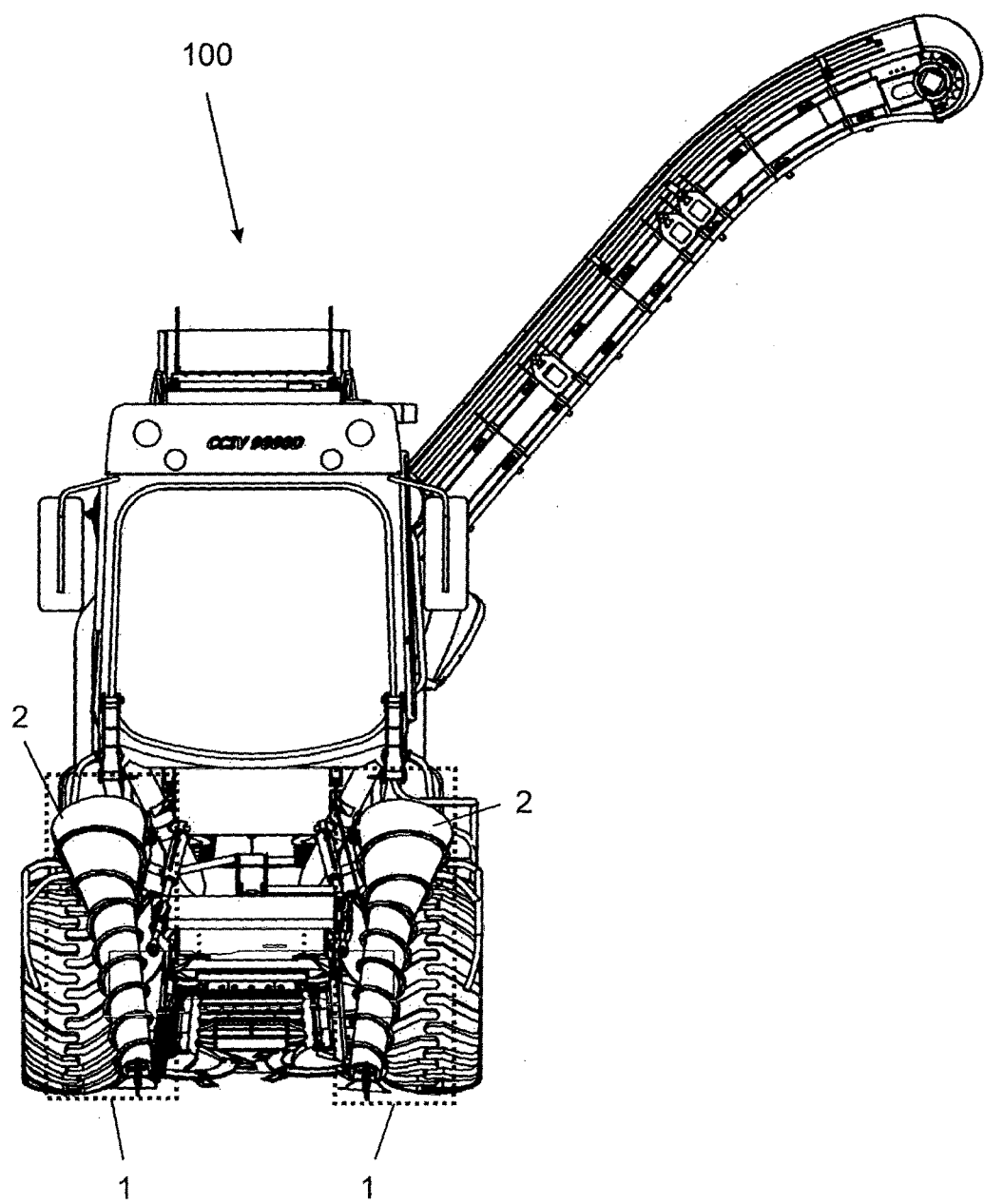
FIG. 4—A front view of a sugar cane harvester having the row divider of the present invention.

FIG. 4 shows a front view of the same embodiment, thus exhibiting the position of the two helicoidal lifts 2 used in this embodiment with more detail. Also in this embodiment it is possible to visually perceive the difference caused by an increase in the cross section of the helicoidal lift 2 in the second segment 4.

It must be understood, that the device described above represents only a preferred embodiment of the present invention, whose actual scope is defined by the appended claims.

The invention claimed is:

1. Row divider (1) applied to a sugar cane harvester (100), said row divider (1) comprising at least one helicoidal lift (2), said helicoidal lift (2) having a conical shape geometry of variable cross section around an imaginary central axis (102), and having a first segment (3) and a second segment (4), the first segment (3) establishing a first generatrix (5) which defines an angle α to the central axis (102) and having in this first segment (3) a first screw thread (6) in its outer surface; and the second segment (4) establishing a second generatrix (7) which defines an angle β to the central axis (102), so that β has a greater value than α and β configures an increase in diameters of the second segment (4) relative to the first segment (3), having in this second segment (4) a second screw thread (8), which is oriented in the opposite direction of the first screw thread (6), in its outer surface.

2. Row divider (1) according to claim 1, wherein said device (1) comprises at least one and no more than four helicoidal lifts (2).

3. Row divider (1) according to claim 1, wherein the ratio between the length of the second segment (4) of the helicoidal lift (2) and the length of the first segment (3) of the helicoidal lift (2) has values between 1 and 0,25.

4. Row divider (1) according to claim 1, wherein the difference between angles β and α has a modulus value between 10° and 35.

5. Row divider (1) according to claim 4, wherein the difference between angles β and α has a modulus value of 11°.

6. Row divider (1) according to claim 1, wherein the inner cavity (9) formed by the second segment (3) of the helicoidal lift (2) allows housing an engine.

7. Sugar cane harvester (100), said sugar cane harvester (100) comprising one row divider (1) as defined in claim 1.

* * * * *